US012517559B2

(12) United States Patent
Iwata et al.

(10) Patent No.: US 12,517,559 B2
(45) Date of Patent: *Jan. 6, 2026

(54) IMAGING APPARATUS AND CONTROL METHOD THEREFOR

(71) Applicant: CANON KABUSHIKI KAISHA, Tokyo (JP)

(72) Inventors: Sairi Iwata, Kanagawa (JP); Yuya Sasaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,165

(22) Filed: Apr. 8, 2024

(65) Prior Publication Data

US 2024/0345633 A1    Oct. 17, 2024

(30) Foreign Application Priority Data

Apr. 13, 2023  (JP) .............................. JP2023-065732

(51) Int. Cl.
*G09G 5/08*    (2006.01)
*G06F 1/16*    (2006.01)
*G06F 1/20*    (2006.01)

(52) U.S. Cl.
CPC .......... *G06F 1/1694* (2013.01); *G06F 1/1618* (2013.01); *G06F 1/206* (2013.01); *G06F 2200/1614* (2013.01); *G06F 2200/1637* (2013.01)

(58) Field of Classification Search
CPC ...... G06F 1/1618; G06F 1/1694; G06F 1/206; G06F 2200/1614; G06F 2200/1637; H04N 23/531; G01P 15/18
See application file for complete search history.

(56) References Cited

U.S. PATENT DOCUMENTS 7,440,003 B2 * 10/2008 Shimamura ......... H04M 1/0212
                                                                  348/14.02
8,416,333 B2 *  4/2013 Nakai ..................... H04N 23/63
                                                                  348/333.13
9,131,131 B2 *  9/2015 Ishikawa .............. H04N 23/531
(Continued)

FOREIGN PATENT DOCUMENTS

JP    2012105069 A    5/2012

*Primary Examiner* — Joe H Cheng
(74) *Attorney, Agent, or Firm* — Canon U.S.A., Inc. IP Division

(57) ABSTRACT

An imaging apparatus includes a display unit, a turning unit configured to turnably hold the display unit with respect to the main body unit, a first acceleration sensor configured to detect a first gravity acceleration applied to the main body unit, a second acceleration sensor configured to detect a second gravity acceleration applied to the display unit, an angle calculation unit configured to calculate posture angles of the display unit and the main body unit from the gravity accelerations acquired from the first acceleration sensor and the second acceleration sensor, and a display switching unit configured to switch a display state of the display unit by determining the display state of the display unit based on the posture angles calculated by the angle calculation unit, wherein it is determined whether to switch the display state of the display unit, based on the display state determined by the display switching unit.

8 Claims, 12 Drawing Sheets

(56) References Cited

U.S. PATENT DOCUMENTS

| | | | | |
|---|---|---|---|---|
| 11,838,632 B2* | 12/2023 | Maniwa | ............... | H04N 23/685 |
| 12,075,163 B2* | 8/2024 | Kumarasamy | ....... | H04N 23/682 |
| 2005/0248678 A1* | 11/2005 | Kawai | .................... | H04N 23/63 |
| | | | | 348/E5.025 |
| 2006/0148540 A1* | 7/2006 | Satoh | .................. | H04M 1/0212 |
| | | | | 455/575.3 |
| 2007/0298850 A1* | 12/2007 | Miyata | .................. | H04M 1/021 |
| | | | | 348/333.06 |
| 2008/0256751 A1* | 10/2008 | Hirose | ................ | H04M 1/0241 |
| | | | | 16/366 |
| 2009/0295975 A1* | 12/2009 | Takahashi | ............ | H04N 23/633 |
| | | | | 348/E5.022 |
| 2010/0144405 A1* | 6/2010 | Hakamata | ............ | H04M 1/021 |
| | | | | 455/575.3 |
| 2012/0045196 A1* | 2/2012 | Takahashi | .............. | H04N 23/51 |
| | | | | 396/374 |
| 2012/0081593 A1* | 4/2012 | Nakagawa | ............. | G03B 13/04 |
| | | | | 348/333.06 |
| 2013/0050557 A1* | 2/2013 | Moriyasu | ............ | H04N 23/531 |
| | | | | 348/E5.026 |
| 2013/0113466 A1* | 5/2013 | Hirayama | .............. | G01B 11/26 |
| | | | | 324/207.2 |
| 2015/0125140 A1* | 5/2015 | Ashizawa | .............. | H02N 2/163 |
| | | | | 396/125 |
| 2024/0348902 A1* | 10/2024 | Iwata | ..................... | H04N 23/63 |

* cited by examiner

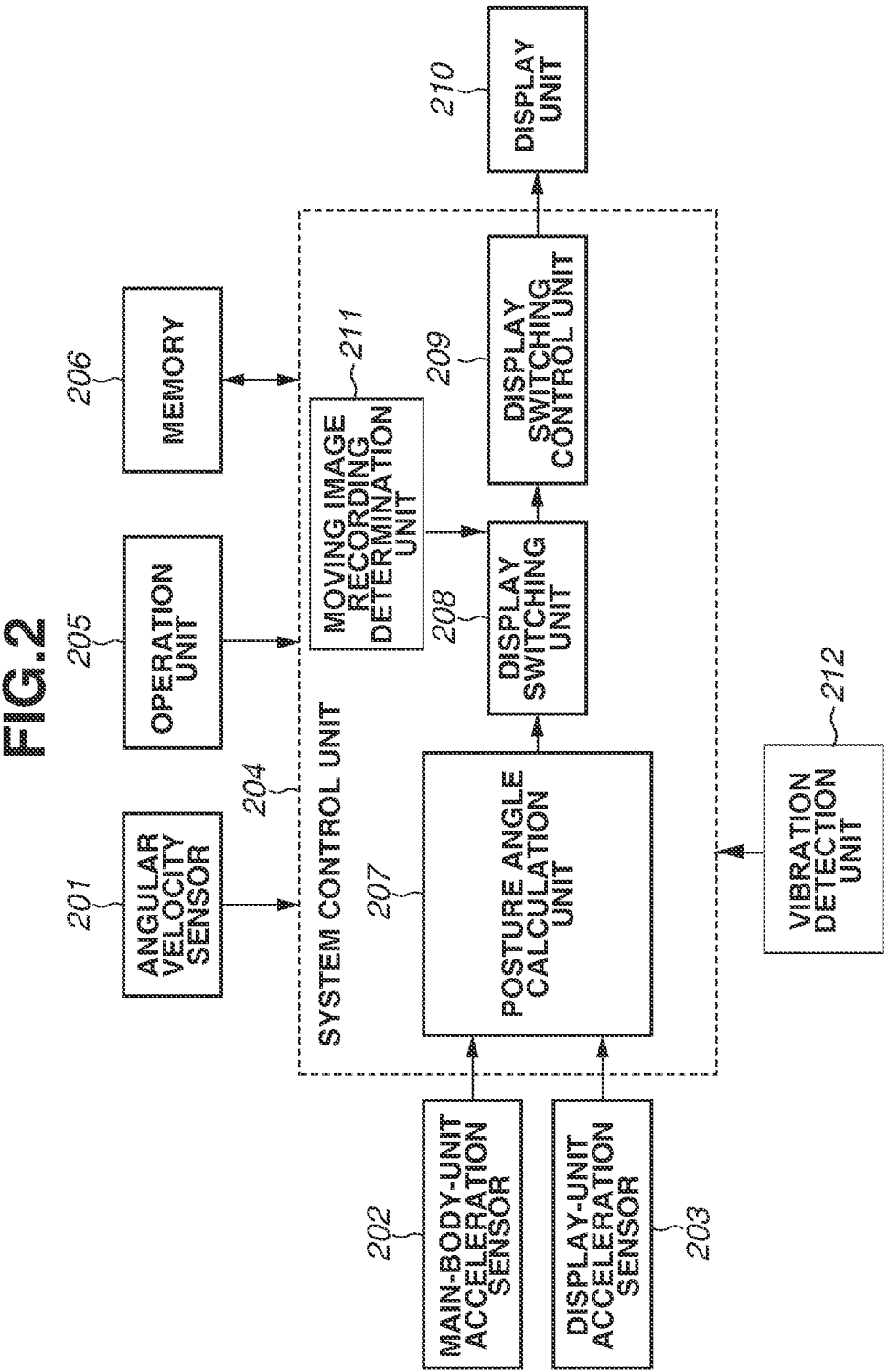

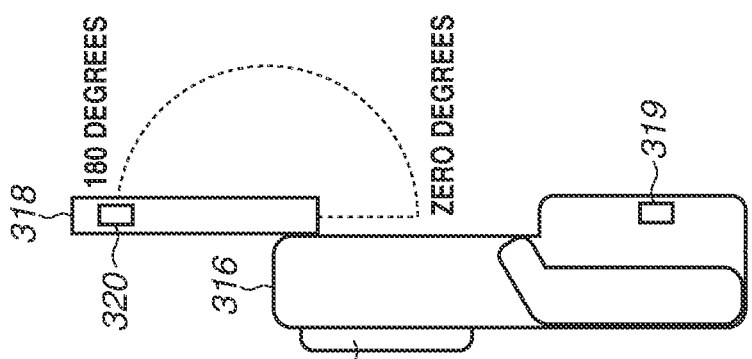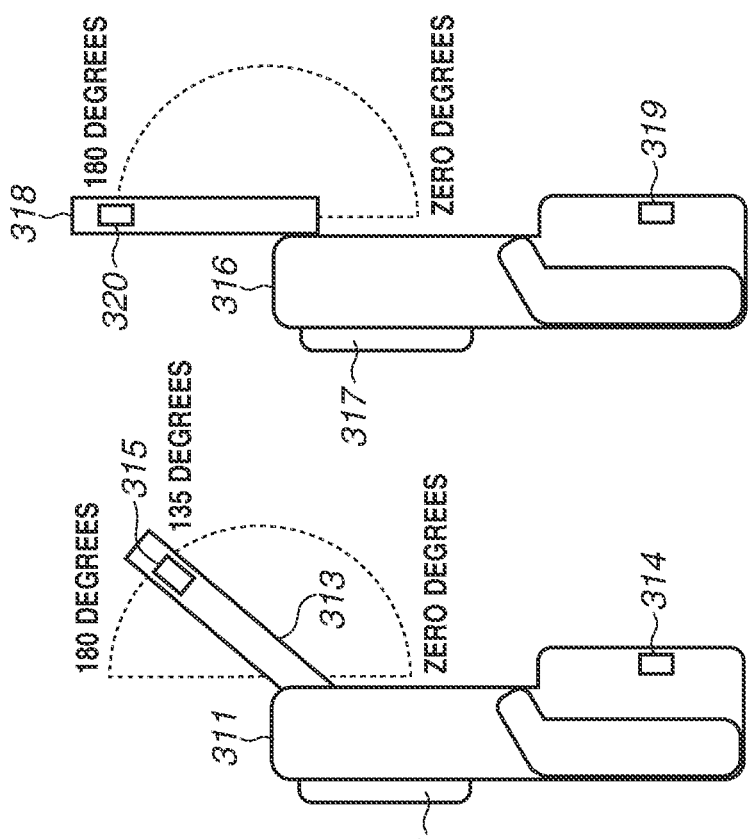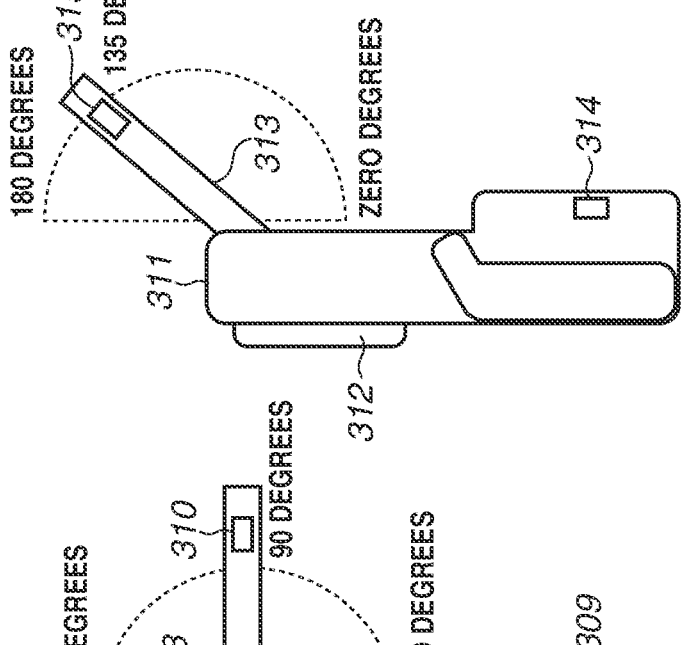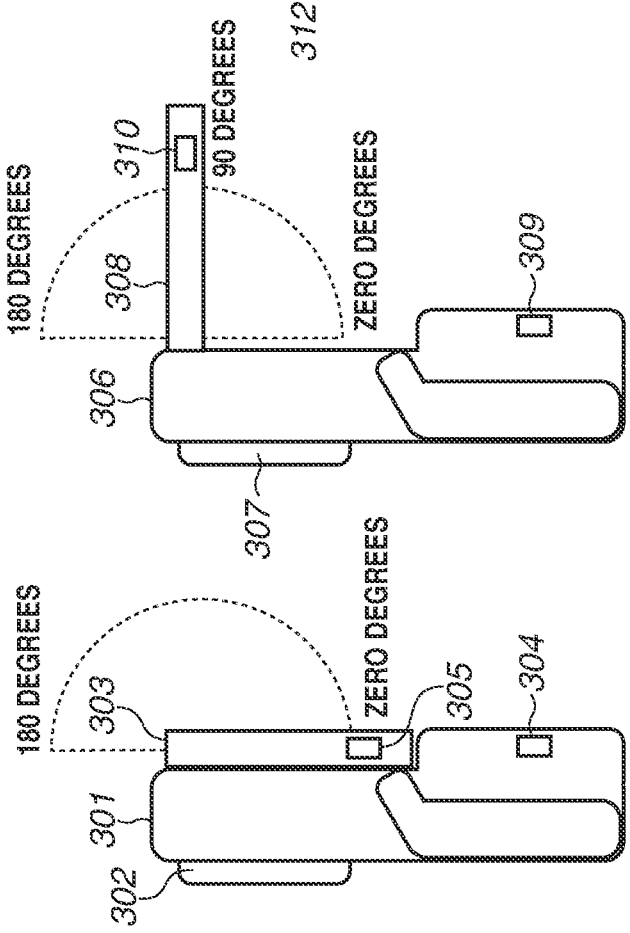

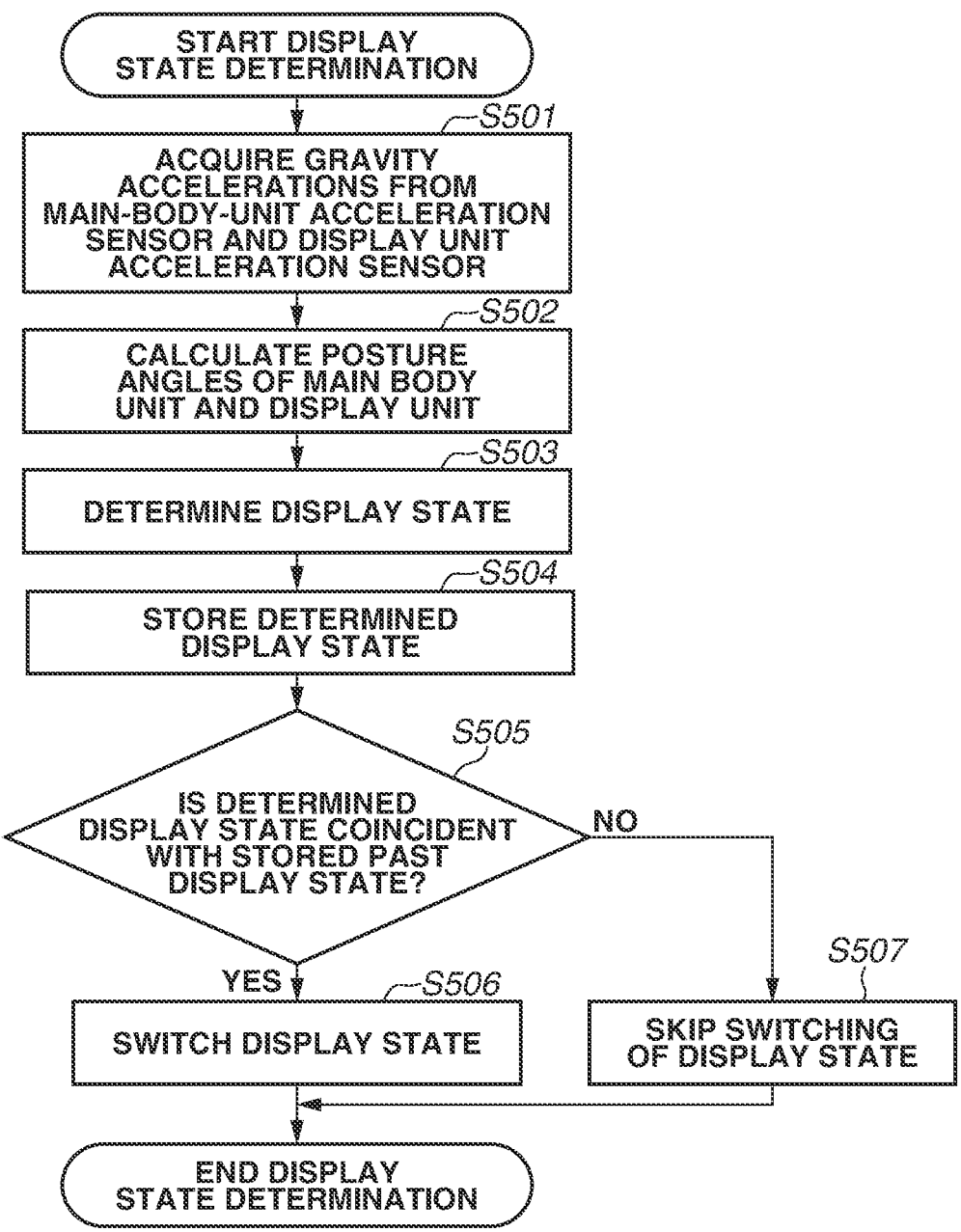

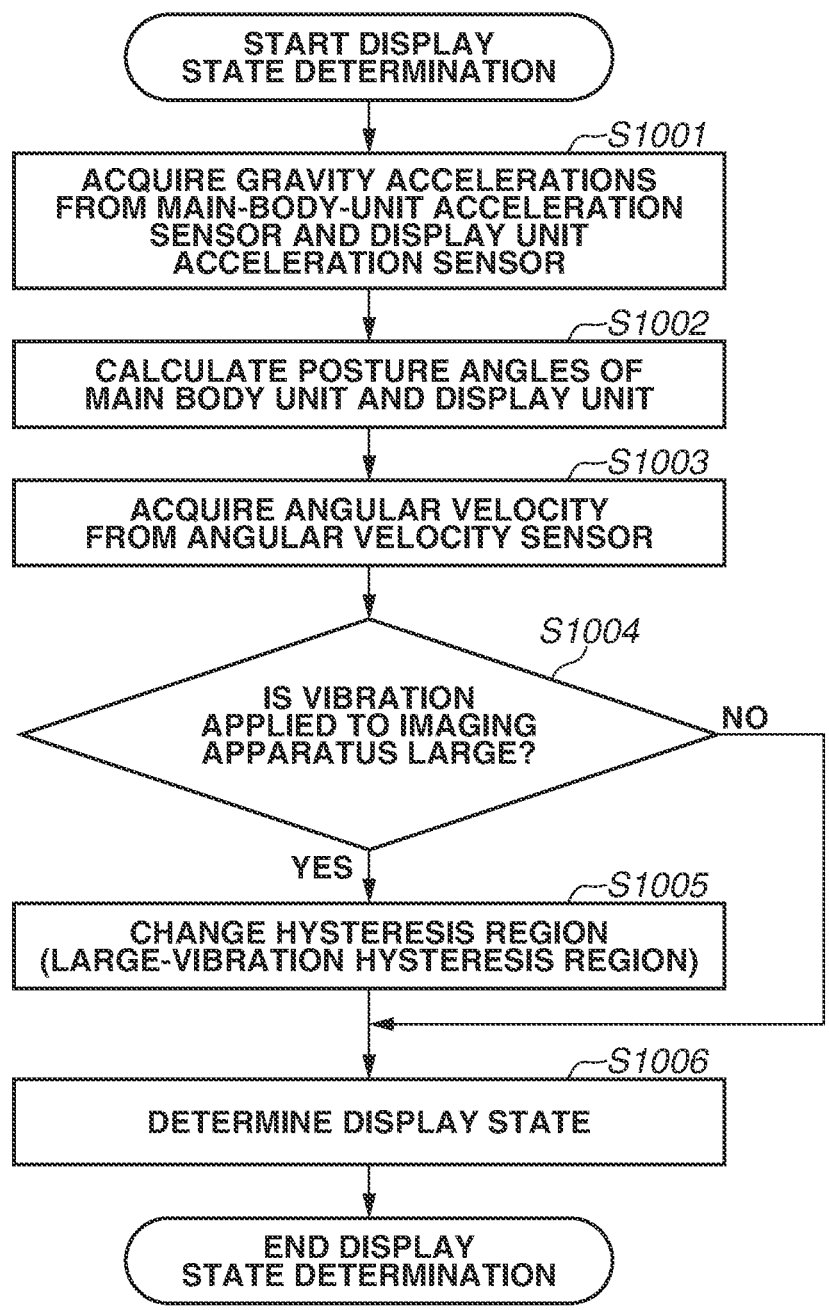

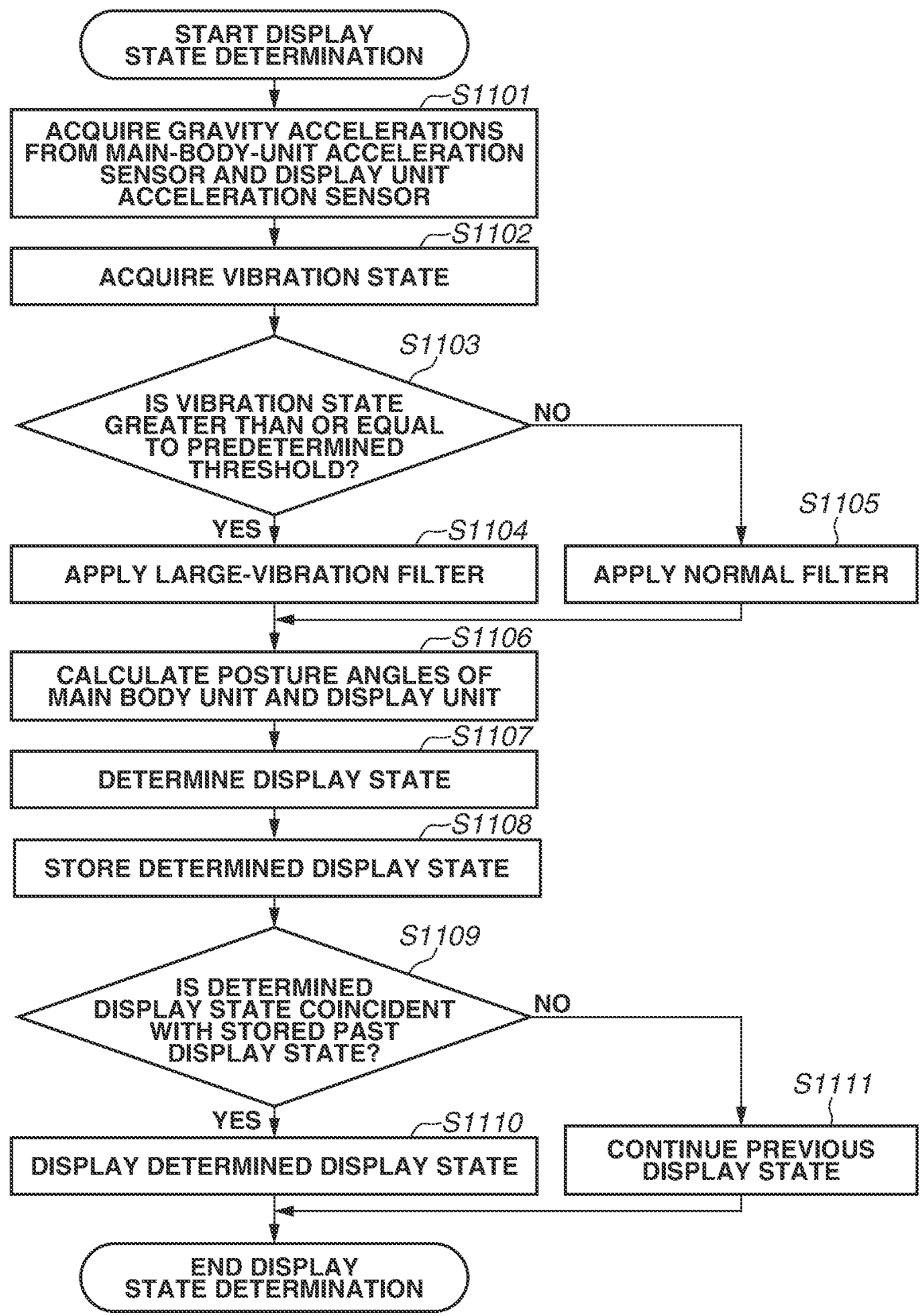

IMAGING APPARATUS AND CONTROL METHOD THEREFOR

CROSS-REFERENCE TO RELATED APPLICATIONS

This application claims priority from Japanese Patent Application No. 2023-065732, filed Apr. 13, 2023, which is hereby incorporated by reference herein in its entirety.

BACKGROUND

Field

The present disclosure relates to an imaging apparatus including a turnable display unit, and to a method of controlling the imaging apparatus.

Description of the Related Art

Many cameras each include a turnable display unit, and the display unit of each of such cameras switches display between "normal display" and "reverse display" based on an opening/closing angle of the display unit.

A magnetism detection method is used for detecting opening/closing of a conventional display unit.

In the magnetism detection method, an angle at which the display is switched is previously determined. In a case where the opening/closing angle of the display unit reaches the determined angle, a sensor reacts to magnetism, and a direction of the display is switched.

Japanese Patent Application Laid-Open No. 2012-105069 discusses a technique for distinguishing an opening/closing state by a magnetic field generating member and a magnetic field detection sensor in a configuration in which a first housing and a second housing are openably/closably supported by a hinge.

Depending on a use state of the camera, even when the opening/closing angle of the display unit reaches the display switching angle in the magnetism detection method, the user does not want the display unit to perform the reverse display in some cases.

In contrast, even when the opening/closing angle does not reach the display switching angle, the user wants the display unit to perform the reverse display in some cases.

In other words, the display desired by the user may not be performed when the display unit is in a middle opening/closing state.

To solve the issue, an acceleration sensor is mounted on each of a camera main body and the display unit to calculate the angle in the middle opening/closing state.

The display is switched based on the middle opening/closing state, which makes it possible to solve the issue of the magnetism detection method.

However, in a case where the display unit is opened to a position close to a boundary for switching the normal display and the reverse display in the middle opening/closing state, and vibration is applied due to movement of the camera, the opening/closing angle goes back and forth between an angle region where the normal display is performed and an angle region where the reverse display is performed, which frequently switches a display state.

To solve the issue, there are a method of changing an angle at which the display state is switched, based on the current display state, and a method of applying filter processing to gravity accelerations acquired from the acceleration sensors to reduce influence by vibration of the camera unnecessary for calculation of the opening/closing angle.

On the other hand, depending on a scene to be captured, the display state desired by the user cannot be realized by the above-described methods.

For example, when the user performs imaging while walking, if strong vibration is temporarily applied to the camera, a calculated angular variation is increased, which frequently switches the display state.

In capturing a moving image, the display state is switched when an imaging posture is changed even though the user does not intend to change composition, and the display state expected by the user cannot be maintained.

SUMMARY

The present disclosure is directed to an imaging apparatus, a control method, and a program for determining a display state and an imaging state of the imaging apparatus, and switching display between normal display and reverse display of a display unit based on a result of the determination.

According to some embodiments, an imaging apparatus can include a display unit, a turning unit configured to turnably hold the display unit with respect to the main body unit, a first acceleration sensor configured to detect a first gravity acceleration applied to the main body unit, a second acceleration sensor configured to detect a second gravity acceleration applied to the display unit, an angle calculation unit configured to calculate posture angles of the display unit and the main body unit from the gravity accelerations acquired from both of the first acceleration sensor and the second acceleration sensor, and a display switching unit configured to switch a display state of the display unit by determining the display state of the display unit based on the posture angles calculated by the angle calculation unit, wherein it is determined whether to switch the display state of the display unit, based on the display state determined by the display switching unit.

Further features of the present disclosure will become apparent from the following description of exemplary embodiments with reference to the attached drawings.

BRIEF DESCRIPTION OF THE DRAWINGS

FIG. 2 is a block diagram of the imaging apparatus according to the exemplary embodiments.

FIGS. 3A, 3B, 3C, and 3D are diagrams each illustrating a state where a display unit of the imaging apparatus is opened/closed, according to the exemplary embodiments.

FIG. 5 is a flowchart illustrating processing for determining a display state based on a state of the imaging apparatus according to a first exemplary embodiment.

FIG. 10 is a flowchart illustrating processing for determining the display state of the display unit according to the second exemplary embodiment.

FIG. 11 is a flowchart illustrating processing for determining a display state based on a state of an imaging apparatus according to a third exemplary embodiment.

DESCRIPTION OF THE EMBODIMENTS

Hereinbelow, various exemplary embodiments, features, and aspects of the present disclosure will be described in detail with reference to drawings.

Figure 1:
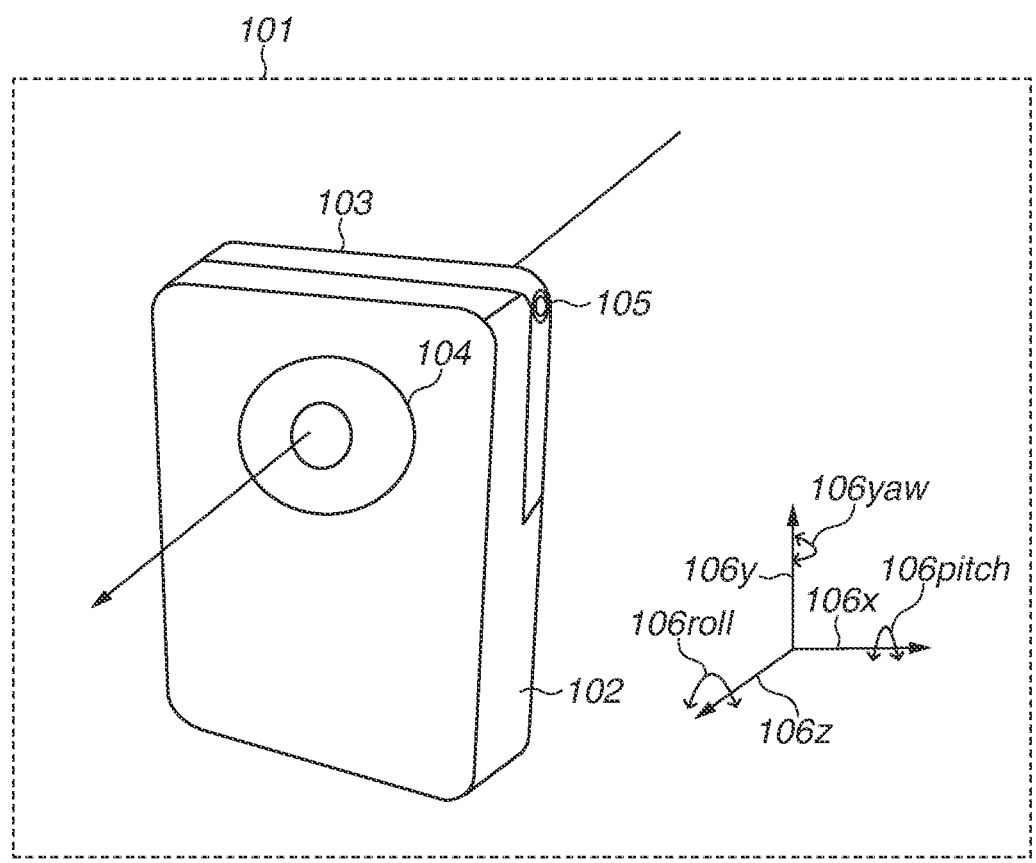
FIG. 1 is a diagram illustrating a configuration of an imaging apparatus, and an axial direction and a rotation direction of a sensor according to exemplary embodiments of the present disclosure.

FIG. 1 is a diagram illustrating a configuration of an imaging apparatus 101, and definition of an axial direction and a rotation direction according to the exemplary embodiments. FIG. 2 is a block diagram of the imaging apparatus 101.

(Appearance Diagram of Imaging Apparatus)

Description is to be given below with reference to FIG. 1. FIG. 1 is a diagram illustrating axes of imaging or camera operation detectable by an angular velocity sensor 201, a main-body-unit acceleration sensor 202, and a display-unit acceleration sensor 203 in FIG. 2 to be described below. The sensors are mounted on the imaging apparatus 101. The imaging apparatus can be configured in the form of a mechanical, digital, or electronic camera, phone, or other device capable of recording, storing, or transmitting an image.

The main-body-unit acceleration sensor 202 and the display-unit acceleration sensor 203 each detect gravity accelerations of three axes 106$x$ (X axis), 106$y$ (Y axis), and 106$z$ (Z axis). The main-body-unit acceleration sensor 202 can be considered a first acceleration sensor, and the display-unit acceleration sensor 203 can be considered a second acceleration sensor.

The angular velocity sensor 201 detects angular velocities 106pitch, 106yaw, and 106roll around the axes 106$x$, 106$y$, and 106$z$.

The imaging apparatus 101 includes a main body unit 102 and a display unit 103 being arranged with a turning unit 105 therebetween. The display unit 103 can turn in a direction 106pitch by the turning unit 105.

The main body unit 102 includes a lens unit 104, and the lens unit 104 has an optical axis in the direction 106$z$.

Description is to be given with reference to FIG. 2. The angular velocity sensor 201 detects, as an angular velocity, vibration applied to the imaging apparatus 101, and the detected angular velocity is input to a system control unit 204.

Outputs of the main-body-unit acceleration sensor 202 and the display-unit acceleration sensor 203 are input to the system control unit 204. The main-body-unit acceleration sensor or first acceleration sensor 202 can be configured to detect a first gravitational acceleration applied to the main body unit 102, and the display-unit acceleration sensor or second acceleration sensor 203 can be configured to detect a second gravitational acceleration applied to the display unit 103.

The system control unit 204 includes one or more processors, one or more memories, circuitry, or combinations thereof, and can be configured in the form of a calculation device or other computing device, such as a central processing unit (CPU), micro processing unit (MPU), or the like.

The system control unit 204 controls the whole of the imaging apparatus 101 by transmitting control commands to the units in response to user operation from an operation unit 205.

The system control unit 204 executes control programs stored in a memory 206.

The gravity accelerations input to the system control unit 204 are input to a posture angle calculation unit 207.

The posture angle calculation unit 207 calculates an inclination angle of the main body unit and an inclination angle of the display unit 103 from the input gravity accelerations. The posture angle calculation unit 207 can be configured to calculate posture angles of the display unit 103 and the main body unit 102 from the gravity accelerations acquired from both of the first acceleration sensor 202 and the second acceleration sensor 203.

A display switching unit 208 determines a display state to be displayed on a display unit 210 based on the calculated inclination angles. The memory 206 is notified of the determined display state, and the determined display state is stores for a predetermined period.

A display switching control unit 209 uses control commands from the operation unit 205 and information stored in the memory 206.

The display switching control unit 209 finally determines whether to display the display state determined by the display switching unit 208 or to continue a current display state by controlling the determined display state, based on the information. The display switching unit 208 can be configured to switch a display state of the display unit 103 by determining the display state of the display unit 103 based on the posture angles calculated by the angle calculation unit, wherein it is determined whether to switch the display state of the display unit 103, based on the display state determined by the display switching unit 208.

The operation unit 205 includes a release switch for issuing an instruction to start imaging, and a touch panel and an operation switch for changing setting and a mode of the imaging apparatus 101. An operation signal of the operation unit 205 is transmitted to the system control unit 204.

The display unit 210 includes a liquid crystal display (LCD), and displays a captured image (image data) and specific information (e.g., imaging information).

In the imaging apparatus 101, the display unit 210 is provided at an upper part on a rear surface side, with the turning unit 105 provided at an uppermost part of the imaging apparatus 101.

For this reason, the user can optionally turn the display unit 210 around the axis 106$x$. In a case where an angle when the display unit 210 is not turned is defined as zero degree, the display unit 210 can be turned up to 180 degrees.

The display unit 103 can be timely adjusted to a position easily viewed by the user.

The exemplary embodiments are to be specifically described.

(Example for Determining Final Display State)

In a first exemplary embodiment, an example for determining a final display state with reference to a past display state of the imaging apparatus 101 is to be described.

FIGS. 3A to 3D illustrate the imaging apparatus 101 as viewed from a side, and FIG. 3A illustrates a main body unit 301, a lens unit 302, and a display unit 303 of the imaging apparatus 101. At this time, a main-body-unit acceleration sensor 304 and a display-unit acceleration sensor 305 are mounted at positions illustrated in FIG. 3A. FIGS. 3B to 3D are similar to FIG. 3A, where FIG. 3B illustrates a main body unit 306, a lens unit 307, a display unit 308, a main-body-unit acceleration sensor 309, and a display-unit acceleration sensor 310, FIG. 3C illustrates a main body unit 311, a lens unit 312, a display unit 313, a main-body-unit acceleration sensor 314, and a display-unit acceleration sensor 315, and FIG. 3D illustrates a main body unit 316, a lens unit 317, a display unit 318, a main-body-unit acceleration sensor 319, and a display-unit acceleration sensor 320.

FIG. 3A illustrates a state where the display unit 303 is not opened, and an opening/closing angle is zero degree.

At this time, the display unit 303 of the imaging apparatus 101 can be opened up to 180 degrees.

FIG. 3B is a diagram in a case where an opening/closing angle of a display unit 310 is 90 degrees. FIG. 3C is a diagram in a case where an opening/closing angle of a display unit 315 is 135 degrees.

FIG. 3D illustrates a state where a display unit 318 is opened by 180 degrees.

The imaging apparatus 101 includes the acceleration sensor on each of the main body unit 102 and the display unit 103, calculates inclinations of the main body unit 102 and the display unit 103 from gravity accelerations acquired from the respective acceleration sensors, and calculates a relative angle of the display unit 103 to the main body unit 102.

In FIGS. 3A to 3D, the display unit 103 is opened/closed in a tilt direction relative to the main body unit 102.

An inclination angle in the tilt direction is calculated using an expression (1), $$\text{Inclincation angle [deg]} = \arctan(Z\text{-axis acceleration} \div Y\text{-axis acceleration}) \times 180 \div \pi. \quad (1)$$

By calculating the inclination of the main body unit and the inclination of the display unit from the expression (1), it is possible to calculate the relative opening/closing angle of the display unit to the main body unit from an expression (2), $$\text{Opening/Closing Angle [deg]} = \text{Inclination Angle of Display unit} - \text{Inclincation Angle of Main Body unit}. \quad (2)$$

The display switching unit 208 determines a display state of information displayed on the display unit 103 from the value of the opening/closing angle, the inclination angle of the main body unit, and the inclination of the display unit acquired in the above-described manner.

For example, in a case where the opening/closing angle is zero degree, normal display is performed, whereas in a case where the opening/closing angle is 180 degrees, reverse display is performed.

In a case where the opening/closing angle is within a range from 45 degrees to 135 degrees, the normal display or the reverse display is determined based on the inclination angle of the main body unit.

(Display State of Display Unit in Case where Vibration is Applied to Imaging Apparatus)

Figure 4A:
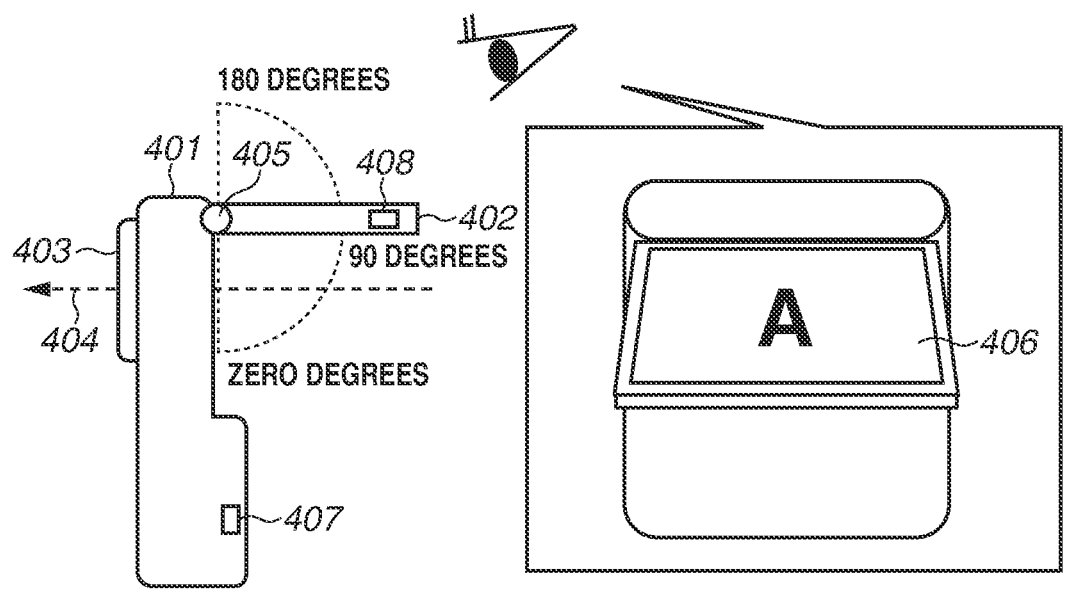
FIGS. 4A and 4B are diagrams each illustrating a display unit in a case where vibration is applied to a conventional imaging apparatus.
Figure 4B:
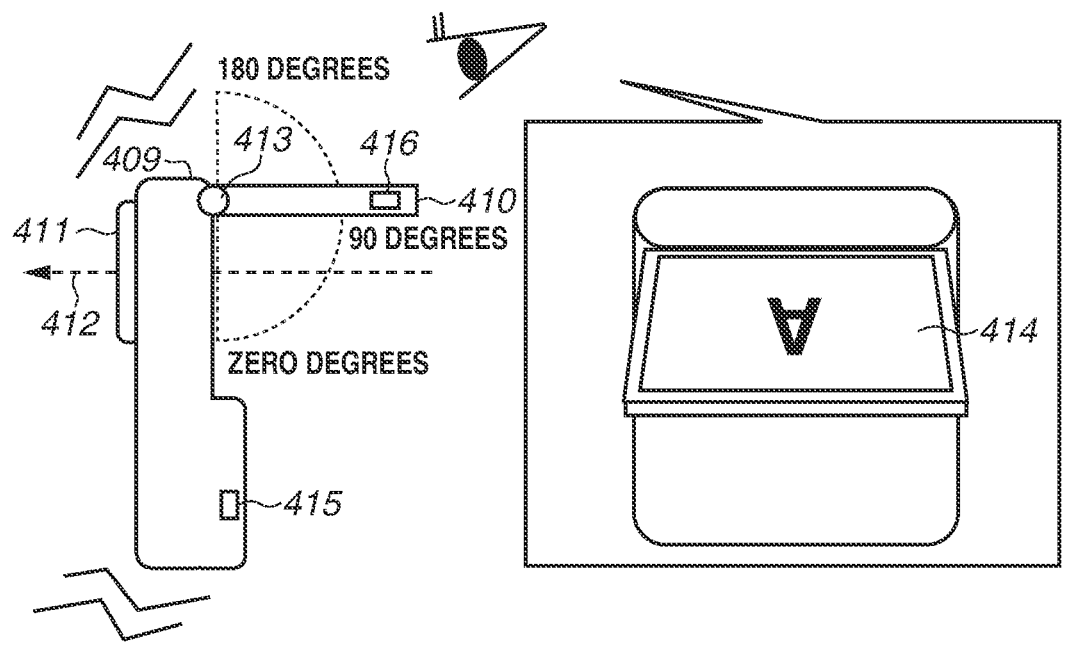

FIGS. 4A and 4B are diagrams each illustrating the display state of the display unit in a case where vibration is applied to the imaging apparatus.

In a main body unit 401 of FIG. 4A, an optical axis 404 of a lens unit 403 is horizontal to the direction 106z, and a main-body-unit acceleration sensor 407, a display unit 402 and a display-unit acceleration sensor 408 are mounted at the positions illustrated. A state where a turning unit 405 is positioned at an upper part in the direction 106y is defined as a state where the inclination angle of the main body unit is zero degree. In a main body unit 409 of FIG. 4B, an optical axis 412 of a lens unit 411 is horizontal to the direction 106z, and a main-body-unit acceleration sensor 415, a display unit 410, and a display-unit acceleration sensor 416 are mounted at the position illustrated. A state where a turning unit 413 is positioned at an upper part in the direction 106y is defined as a state where the inclination angle of the main body unit is zero degree.

The opening/closing angle of the display unit in a state where a display unit 402 is positioned in parallel with the lens unit 403 is defined as zero degree.

In FIG. 4A, the display unit 402 is opened by 90 degrees, and in FIG. 4B, the display unit 410 is opened by 90 degrees.

As illustrated in FIG. 4A, in a case where the opening/closing angle of the display unit is 90 degrees and the inclination angle of the main body unit is zero degree, a scene where the user holds the camera in front of the user while the camera is positioned below an eye line is presumed.

Accordingly, the display switching unit 208 determines the normal display, and the display unit 103 displays normal display information 406.

The method of determining the inclination angle of the main body unit and the opening/closing angle of the display unit is illustrative, and the method is not limited to the above-described method for implementation. The above-described method of determining the normal display and the reverse display is also illustrative, and the method is not limited to the above-described method for implementation.

FIG. 4B illustrates an example in a case where vibration is applied to the imaging apparatus 101.

When vibration is applied, the inclination angle of the main body unit calculated from the gravity accelerations of the main-body-unit acceleration sensor 202 is changed from zero degree.

The opening/closing angle calculated from the gravity accelerations of the display-unit acceleration sensor 203 is changed from 90 degrees.

At this time, the main-body-unit acceleration sensor 202 and the display-unit acceleration sensor 203 are mounted at different positions. Accordingly, the inclination angles changed by vibration are not always equal to each other.

In a case where the inclination angles changed by vibration are not equal to each other, the calculated opening/closing angle may be changed from the opening/closing angle in a state where no vibration is applied, and a result of the display switching unit 208 may be changed.

When reverse display information 414 is displayed on the display unit 402 having performed the normal display, a disadvantage that it is difficult for the user to view the information displayed on the display unit 402 occurs. Processing illustrated in FIG. 5 to be described below copes with the disadvantage.

(Processing for Determining Display State in Steps S501 to S507)

Processing for determining the display state in steps S501 to S507 according to the present exemplary embodiment is to be described with reference to a flowchart illustrated in FIG. 5.

In step S501, the gravity accelerations are acquired from the main-body-unit acceleration sensor 202 and the display-unit acceleration sensor 203.

In step S502, the posture angles of the main body unit and the display unit are calculated from the acquired gravity accelerations.

In step S503, the display state of the screen displayed on the display unit 210 is determined from the calculated posture angles.

In step S504, the determined display state is stored in the memory 206 for a predetermined period.

In step S505, the past display state stored in the memory 206 is referred to, and it is determined whether the display state determined at this time is coincident with the stored past display state.

In a case where the display state is coincident with the stored past display state (YES in step S505), the processing proceeds to step S506. In step S506, the display state is switched.

In a case where the display state is not coincident with the stored past display state (NO in step S505), the processing proceeds to step S507. In step S507, the display state determined in step S503 is controlled, and the display state is not switched to the determined display state.

(Determination Method in Step S505)

Figure 6:
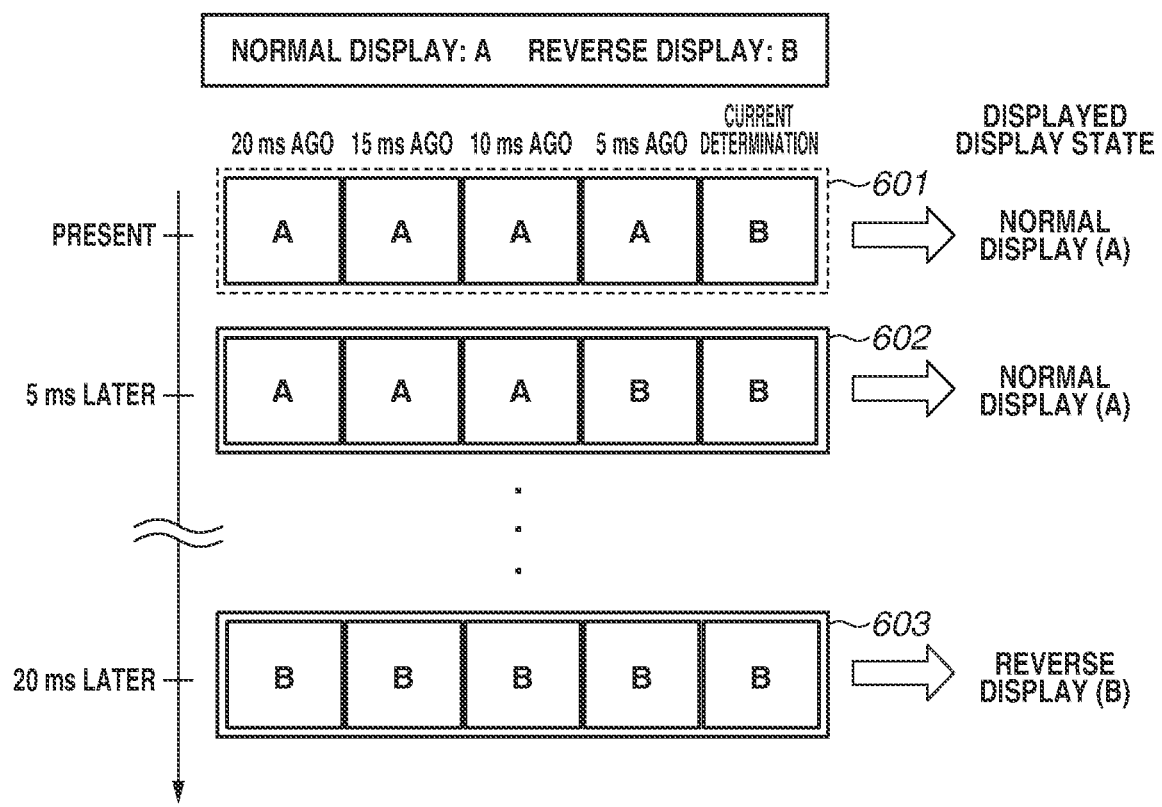
FIG. 6 is a diagram illustrating stored display states according to the first exemplary embodiment.

FIG. 6 illustrates an example of the determination method in step S505.

In FIG. 6, the normal display is denoted by A, and the reverse display is denoted by B.

Diagrams 601 to 603 each illustrate the display states stored in the memory 206 changed with time.

A present memory in the diagram 601 stores that each of the display states from 5 milliseconds (ms) ago to 20 ms ago is the normal display A.

A result of the current determination is the reverse display B, and is not coincident with the past display states. Accordingly, the result B of the current determination is controlled, and the normal display A is performed on the display unit.

The diagram 602 illustrates a memory state 5 ms later from the present.

A result of the current determination is also the reverse display B, but each of the display states from 10 ms ago to 20 ms ago is the normal display A and is not coincident with the result of the current determination. Accordingly, the normal display A is performed on the display unit.

The diagram 603 illustrates a memory state 20 ms later from the present.

A result of the current determination is also the reverse display B, and is coincident with the past display states. Accordingly, the display state is switched, and the reverse display B is performed.

The above-described determination method is illustrative, and the method is not limited to the above-described determination method for implementation.

In FIG. 6, an interval of the stored display states is 5 ms, and data for past 20 ms is stored, but the interval and the storage period are not limited to these examples.

In FIGS. 5 6, the display state is switched in the case where the result of the current determination is coincident with all of the stored displayed states. Alternatively, the display state may be switched in a case where the result of the current determination is coincident with half or more of the stored display states.

The display state necessary for the determination may be made changeable.

In this case, a response speed for switching the display state can be changed. For example, the display switching response speed is made selectable by the user. Determination is performed based on the display states of the number corresponding to the speed selected by the user, which makes it possible to change the response speed to the response speed intended by the user.

In a case where the user wants to reduce the switching response speed, it is possible to reduce the switching response speed by increasing the number of stored display states used for the determination.

The display state to be displayed is determined with reference to the past display states as described above, which makes it possible to perform switching of the display state intended by the user even in a case where large vibration is applied to the camera.

In the first exemplary embodiment, the example in which the past display states are previously stored, and the display state to be displayed is determined by using the past display states is described. However, the configuration is not necessarily optimal in all of the exemplary embodiments.

For example, there is a case where the user capturing a moving image by using the imaging apparatus 101 wants to change an imaging posture while maintaining the display state of the display unit.

In a case where the user captures an image of a front side while holding the imaging apparatus 101 in front of a chest, the display unit is opened/closed by 90 degrees to enable the user to easily view the display unit from above.

When an object to be captured is changed from the front in an oblique upper direction in the middle of imaging, the user may open/close the display unit beyond 90 degrees to facilitate viewing of the display unit.

At this time, the display state is switched to the reverse display even though the user wants the display unit to perform the normal display.

As described above, the expected display state is not obtainable depending on the posture in imaging. In such a case, the display state is switched against the intention of the user.

(Boundary for Switching Display State)

Figure 7A:
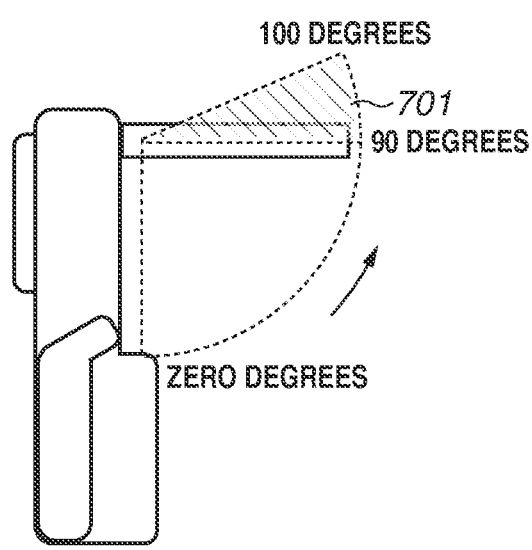
FIGS. 7A and 7B are diagrams each illustrating an opening/closing angle for determining a display state of a conventional imaging apparatus.
Figure 7B:
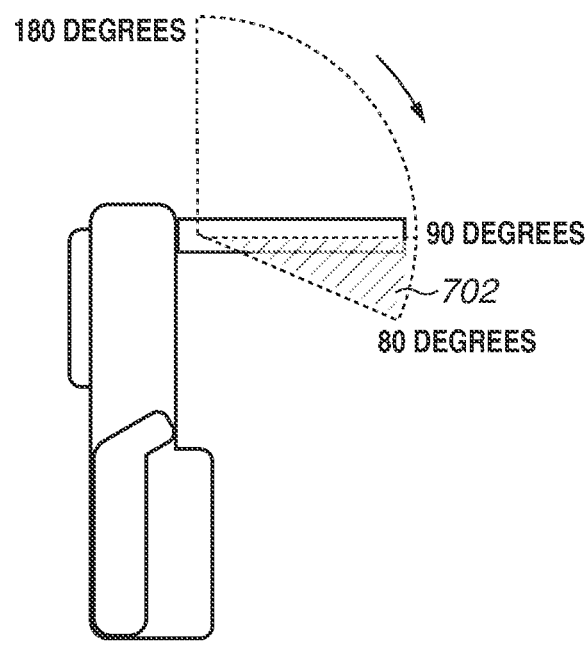

In most cases, as illustrated in FIGS. 7A and 7B, a margin is provided to a boundary for switching the display state, to continue the current display state.

For example, as illustrated in FIG. 7A, in a case where the opening/closing angle of 90 degrees is the boundary for switching the display state, and the current display state is the normal display, the boundary for switching the display state is changed to 100 degrees, and the normal display is performed within a region 701 from 90 degrees to 100 degrees.

In contrast, as illustrated in FIG. 7B, in a case where the current display state is the reverse display, the boundary for switching the display state to the normal display is changed to 80 degrees, and the reverse display is performed within a region 702 from 80 degrees to 90 degrees.

In the following, a region for determining the display state, changed based on the current display state, is referred to as a hysteresis region.

However, in the above-described case where the imaging posture is changed or other cases, the angle is changed beyond the provided hysteresis region, and the display state is switched.

Figure 8:
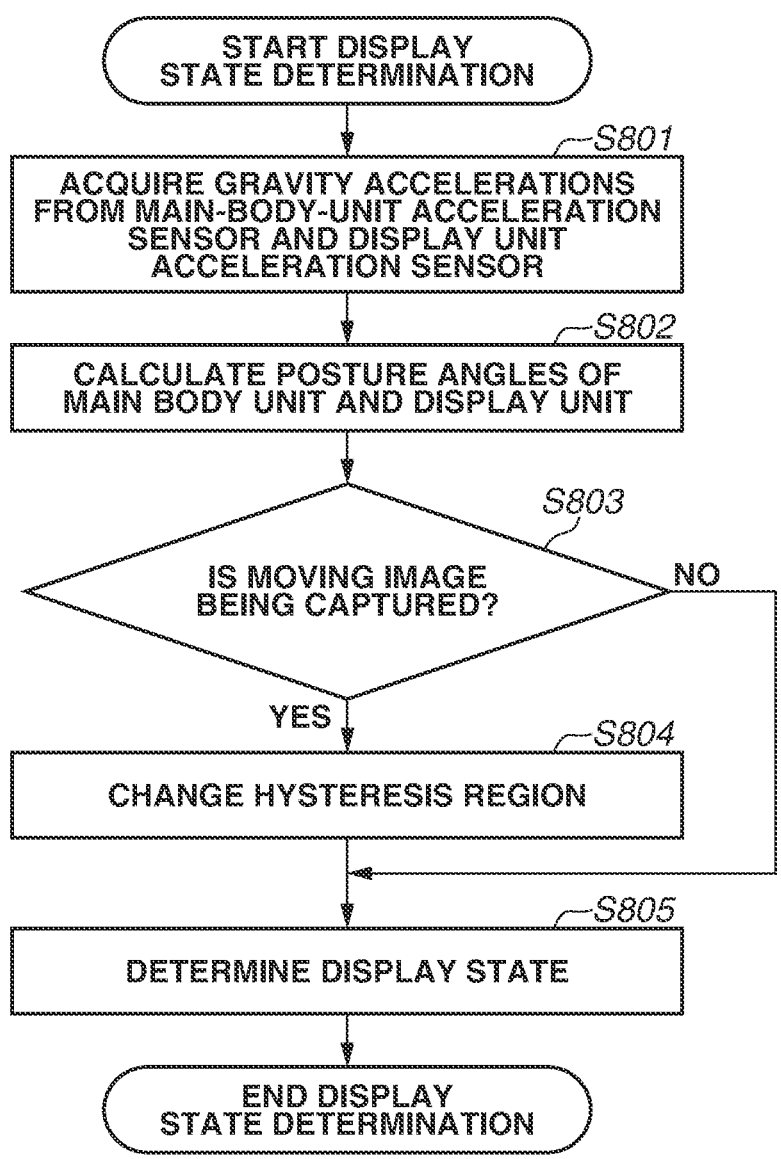
FIG. 8 is a flowchart illustrating processing for determining opening/closing angle for determining a display state of a display unit according to a second exemplary embodiment.

As a second exemplary embodiment, an example in which the display state is switched based on a situation in capturing a moving image is to be described with reference to FIG. 8.
(Determination of Display State)

In step S801, the gravity accelerations are acquired from the main-body-unit acceleration sensor 202 and the display-unit acceleration sensor 203.

In step S802, the posture angles of the main body unit and the display unit are calculated from the acquired gravity accelerations.

In step S803, control information indicating whether the imaging apparatus 101 is capturing a moving image is acquired from the operation unit 205, to determine whether the moving image is being captured.

In a case where the moving image is being captured (YES in step S803), the processing proceeds to step S804. In step S804, to prevent the display state from being frequently switched by change of the imaging posture, the hysteresis region for determining the display state is changed.

In a case where the moving image is not being captured (NO in step S803), the hysteresis region is not changed, and the normal region is set.

In step S805, the display state is determined from the posture angles of the main body unit and the display unit calculated in step S802 and the hysteresis region set by the determination in step S803.
(Hysteresis Region Changed in Capturing Moving Image)

Figure 9A:
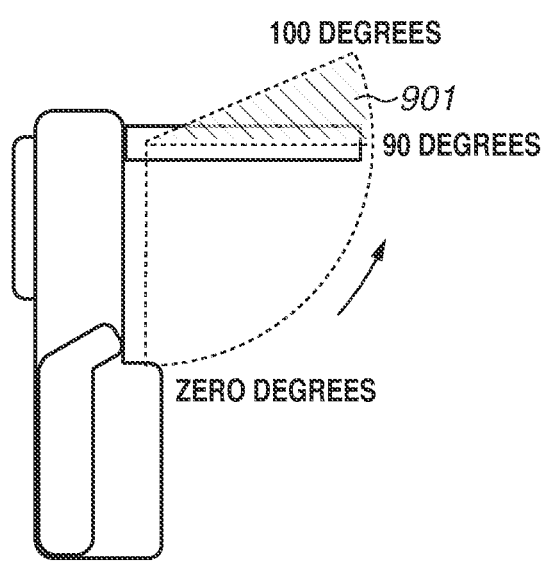
FIGS. 9A and 9B are diagrams each illustrating the opening/closing angle for determining the display state according to the second exemplary embodiment.
Figure 9B:
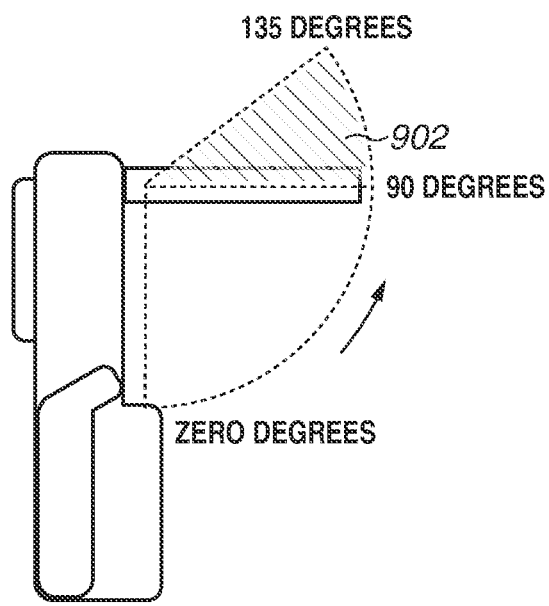

FIGS. 9A and 9B each illustrate the hysteresis region changed in capturing a moving image.

In FIG. 9A, in the state of the normal display, a normal hysteresis region 901 is set to the opening/closing angle of 90 degrees to 100 degrees, and the normal display is continued.

FIG. 9B illustrates a hysteresis region 902 changed in capturing a moving image. At this time, the opening/closing angle of 90 degrees to 135 degrees is also set as the hysteresis region where the normal display is performed.

In the above description, the normal hysteresis region in the case of the normal display is the opening/closing angle of 90 degrees to 100 degrees, and the changed hysteresis region is the opening/closing angle of 90 degrees to 135 degrees.

The opening/closing angles of the normal hysteresis region and the changed hysteresis region are not limited to the above examples. A hysteresis region in the case of the reverse display is similar to the above examples.

In the present exemplary embodiment, the method of changing the hysteresis region in capturing a moving image as the display switching control unit is described.

The method of changing the hysteresis region is not limited to capturing the moving image.

For example, vibration applied to the imaging apparatus 101 may be detected using the angular velocity acquired from the angular velocity sensor 201, and the hysteresis region may be changed based on a magnitude of the vibration even when the moving image is not being captured. FIG. 10 illustrates a flowchart.
(Method of Changing Hysteresis Region Even when Moving Image is not being Captured)

In step S1001, the gravity accelerations are acquired from the main-body-unit acceleration sensor 202 and the display-unit acceleration sensor 203.

In step S1002, the posture angles of the main body unit and the display unit are calculated from the acquired gravity accelerations.

In step S1003, the angular velocity is acquired from the angular velocity sensor 201. In step S1004, the magnitude of vibration applied to the imaging apparatus 101 is determined based on the acquired angular velocity.

In a case where it is determined that the vibration is large (YES in step S1004), the processing proceeds to step S1005. In step S1005, the hysteresis region is changed for large vibration. Otherwise (NO in step S1004), the hysteresis region is not changed.

In step S1006, the display state is determined from the posture angles of the main body unit and the display unit calculated in step S1002 and the set hysteresis region.

The method of detecting the vibration applied to the imaging apparatus 101 by using the angular velocity sensor 201 is described above with reference to FIG. 10.

The information used for detecting vibration is not limited to the information by the angular velocity sensor. For example, vibration may be detected using the gravity accelerations acquired from the acceleration sensors such as the main-body-unit acceleration sensor and the display-unit acceleration sensor.

In the present exemplary embodiment, the method of changing the hysteresis region in capturing a moving image and the method of changing the hysteresis region based on the vibration applied to the imaging apparatus are described above.

The condition for changing the hysteresis region is not limited to the above-described example. The hysteresis region may be determined based not on a single condition but on a plurality of conditions in combination.

According to the present exemplary embodiment, when the imaging posture is changed in capturing a moving image, frequent switching of the display state is controlled.

Features of the first and second exemplary embodiments are to be described.

An imaging apparatus includes a main body unit, a display unit, a turning unit configured to turnably hold the display unit with respect to the main body unit, a first acceleration sensor configured to detect a first gravity acceleration applied to the main body unit, and a second acceleration sensor configured to detect a second gravity acceleration applied to the display unit.

The imaging apparatus includes an angle calculation unit configured to calculate posture angles of the display unit and the main body unit from the gravity accelerations acquired from both of the first acceleration sensor and the second acceleration sensor.

The imaging apparatus includes a display switching unit configured to switch a display state of the display unit by determining the display state of the display unit based on the posture angles calculated by the angle detection unit.

It is determined whether to switch the display state of the display unit, based on the display state determined by the display switching unit.

A second feature is to be described.

The display switching unit includes a display storage unit configured to store the display state determined by the display switching unit over time, and a response speed setting unit configured to set a response speed of display switching.

In a case where the same display state is continued within a time set by the response speed setting unit, the continued display state is displayed.

A third feature is to be described.

The display switching unit includes a moving image recording determination unit 211 configured to determine whether a moving image is being recorded.

The display switching unit includes a function of switching a display state between a first display state and a second display state.

In a case where the moving image recording determination unit determines that a moving image is being recorded, a boundary angle for switching a display state between the first display state and the second display state is expanded.

A fourth feature is to be described.

The imaging apparatus includes a vibration detection unit 212 to detect vibration applied to the main body unit or the display unit.

In a case where the vibration detected by the vibration detection unit is greater than a predetermined threshold, the display switching unit expands the boundary angle for switching a display state between the first display state and the second display state.

In the first and second exemplary embodiments, the posture angles are calculated from the gravity accelerations acquired by the main-body-unit acceleration sensor 202 and the display-unit acceleration sensor 203.

The display state is determined from the posture angles thus determined, and it is determined whether to switch the display state.

In a case where errors in the calculated posture angles are large, however, the configuration is not necessarily optimal.

For example, in a case where the user performing imaging by using the imaging apparatus 101 walks on a bad road including height difference, it is anticipated that vibration stronger than vibration caused by landing of normal walking is continuously applied to the imaging apparatus.

At this time, the calculated posture angles may include errors due to vibration of landing.

In a case where the posture angles continuously include errors or the errors are large, the display state is switched to the reverse display even through the user wants the display unit to perform the normal display.

When the posture angles can be more accurately calculated, it is possible to switch the display state intended by the user.

Figure 12:
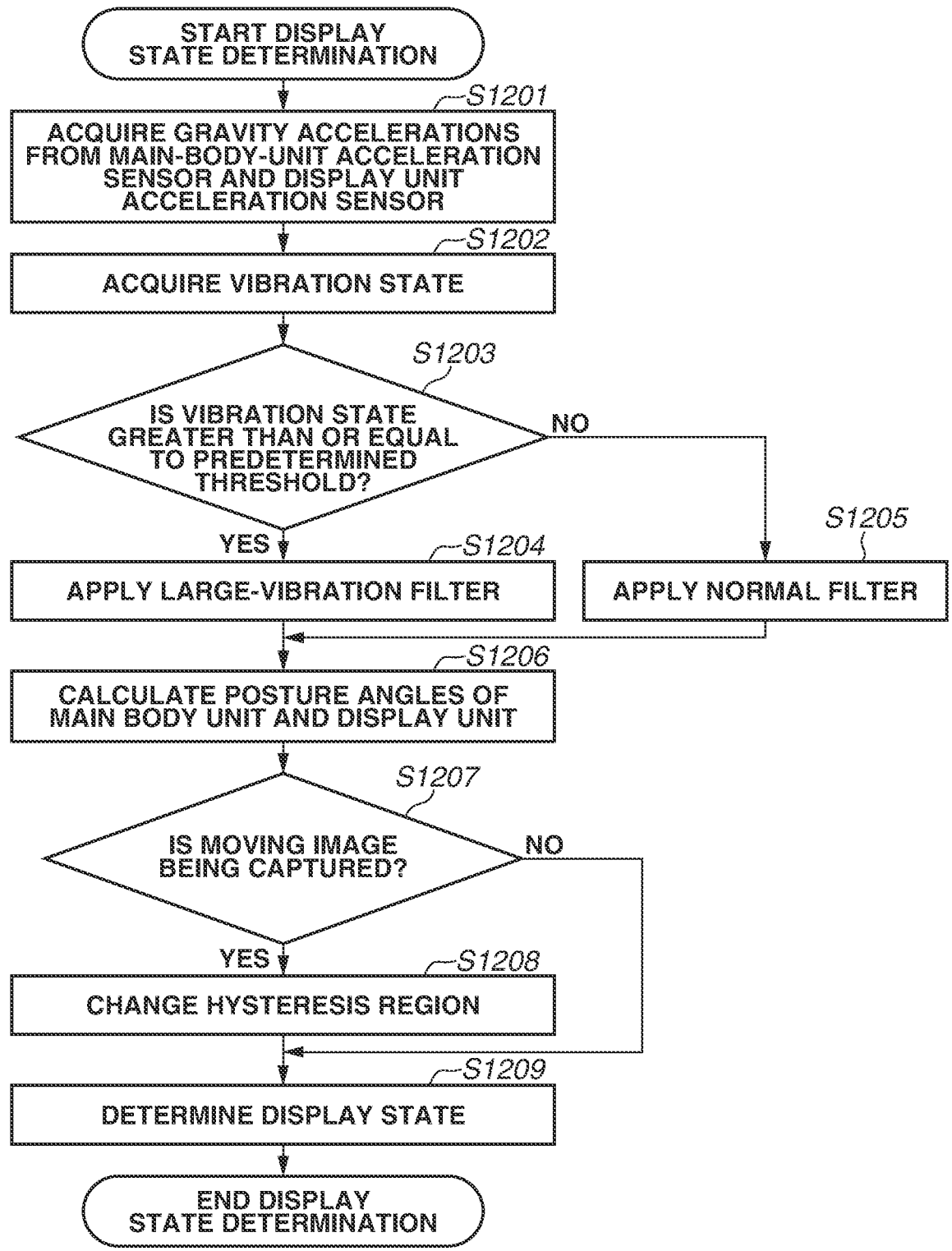
FIG. 12 is a flowchart illustrating processing for determining a hysteresis region based on whether a moving image is being captured according to the third exemplary embodiment.

As a third exemplary embodiment, an example in which the posture angles are more accurately calculated and the display state is switched is to be described with reference to FIG. 11 and FIG. 12.

(Method of Lowering Cutoff Frequency at Application of Large Vibration)

In step S1101 in FIG. 11, the gravity accelerations are acquired from the main-body-unit acceleration sensor 202 and the display-unit acceleration sensor 203.

In step S1102, a vibration state is acquired from the angular velocity sensor 201. In step S1103, it is determined whether the vibration state acquired in step S1102 is greater than or equal to a predetermined threshold.

In a case where the vibration state is greater than or equal to the threshold (YES in step S1103), the processing proceeds to step S1104. In step S1104, a lowpass filter having a cutoff frequency lower than a cutoff frequency of a normal filter is applied as a large-vibration filter to the values of the acceleration sensors acquired in step S1101.

In a case where the vibration state is less than the threshold (NO in step S1103), the processing proceeds to step S1105. In step S1105, a lowpass filter having the cutoff frequency higher than the cutoff frequency of the large-vibration filter is applied as the normal filter.

As the large-vibration filter, the lowpass filter having the cutoff frequency lower than the cutoff frequency of the normal filter is applied, which makes it possible to control change in gravity accelerations caused by vibration. As a result, it is possible to calculate more accurate posture angles in step S1106.

The method of changing the cutoff frequency of the lowpass filter to be applied is to be described above.

It is obvious that the filter is not limited to the lowpass filter, and the present exemplary embodiment is applicable to a case where noise caused by disturbance is reduced by applying another filter such as a bandpass filter.

In the method of determining the cutoff frequency, the cutoff frequency may be changed based on the magnitude of the vibration or based on the mounting positions of the acceleration sensors.

The cutoff frequency may be determined based on temperature information inside the imaging apparatus 101.

In a case where the imaging apparatus 101 includes a temperature information acquisition unit in the main body unit, a temperature inside the main body unit can be measured.

The cutoff frequency of the filter when the measured temperature of the main body unit is high is set lower than the cutoff frequency of the filter when the temperature is low.

As a result, even in a state where noise is easily applied to the acceleration sensors caused by increase in temperature, the posture angles can be calculated with high accuracy as compared with a case where the cutoff frequency is not changed.

The temperature of the imaging apparatus is increased with time from startup.

For this reason, even in the display unit not including the temperature information acquisition unit, the cutoff frequency of the filter when a long time has elapsed from startup of the imaging apparatus 101 is set lower than the cutoff frequency of the filter when a short time has elapsed from startup of the imaging apparatus 101. This makes it possible to calculate the posture angles with higher accuracy.

In steps S1107 to S1111, the determined display state is stored for the predetermined period, and the determined display state is displayed when the display state is coincident with the stored display state, as in steps S503 to S507 in the first exemplary embodiment.

The third exemplary embodiment is to be described with reference to a flowchart in FIG. 12.

Steps S1201 to S1206 are similar to steps S1101 to S1106 described above.

In a case where the vibration state is large, the lowpass filter having the cutoff frequency lower than the cutoff frequency of the normal filter is applied as the large-vibration filter to the values of the acceleration sensors, which makes it possible to control change in gravity accelerations caused by vibration, and to calculate more accurate posture angles.

In steps S1207 to S1209, it is determined whether the moving image is being captured, and in the case where the moving image is being captured, the hysteresis region for determining the display state is expanded, as in steps S803 to S805 in the second exemplary embodiment. The display state is determined using the hysteresis region determined based on the determination in step S1207.

According to the present exemplary embodiment, it is possible to more accurately calculate the posture angles than in a case where the processing in the present exemplary embodiment is not performed, and to determine the display state. This makes it possible to switch the display state intended by the user.

Features of the third exemplary embodiment are organized and described.

A fifth feature is to be described.

A method of calculating the posture angles by the angle calculation unit is changed based on a state of the vibration detected by the vibration detection unit.

A sixth feature is to be described.

The angle calculation unit includes a lowpass filter.

A cutoff frequency of the lowpass filter in a case where the vibration applied to the imaging apparatus detected by the vibration detection unit is large is set lower than a cutoff frequency of the lowpass filter in a case where the vibration is small.

A seventh feature is to be described.

The imaging apparatus includes a first acceleration sensor configured to detect a first gravity acceleration applied to the main body unit, and a second acceleration sensor configured to detect a second gravity acceleration applied to the display unit.

The first acceleration sensor detecting the first gravity acceleration applied to the main body unit and the second acceleration sensor detecting the second gravity acceleration applied to the display unit each detect the gravity acceleration by the same acceleration sensor.

An eighth feature is to be described.

The angle calculation unit includes a temperature information acquisition unit configured to acquire temperature information inside the imaging apparatus, and an elapsed time acquisition unit configured to acquire an elapsed time from startup of the imaging apparatus.

The temperature information acquisition unit is arranged at a position closer to the first acceleration sensor than to the second acceleration sensor.

By using the temperature information inside the imaging apparatus acquired by the temperature information acquisition unit, the first acceleration sensor sets the cutoff frequency of the lowpass filter when the temperature information is high, to be lower than the cutoff frequency of the lowpass filter when the temperature information is low.

Alternatively, by using the time acquired by the elapsed time acquisition unit, the first acceleration sensor sets the cutoff frequency of the lowpass filter when the time acquired by the elapsed time acquisition unit is long, to be lower than the cutoff frequency of the lowpass filter when the time is short.

The second acceleration sensor sets the cutoff frequency of the lowpass filter when the time acquired by the elapsed time acquisition unit is long, to be lower than the cutoff frequency of the lowpass filter when the time is short.

Although the present disclosure is described in detail based on the preferred exemplary embodiments, the present disclosure is not limited to the specific exemplary embodiments, and also include various modes without departing from the spirit of the present disclosure.

The above-described exemplary embodiments may be partially combined as appropriate.

The present disclosure also includes a case where software programs realizing the functions of the exemplary embodiments are supplied to a system or an apparatus including a computer that can execute the programs directly from a recording medium or by using wired/wireless communication, and the computer executes the programs.

The program codes themselves supplied to and installed in the computer in order to cause the computer to realize the functions/processing of the present disclosure also realize the present disclosure.

The computer programs themselves for realizing the functions/processing of the present disclosure are also included in the present disclosure.

In this case, each program may take any form, for example, an object code, a program to be executed by an interpreter, or script data to be supplied to an operating system (OS), as long as it has the function of the program.

Examples of the recording medium for supplying the programs include a hard disk drive, a magnetic recording medium such as a magnetic tape, an optical/magnetooptical recording medium, and a nonvolatile semiconductor memory.

As a method of supplying the programs, the computer programs realizing the present disclosure may be stored in a server on a computer network, and a connected client computer may download and program the computer programs.

Some exemplary embodiments of the present disclosure are described below.

Configuration 1

An imaging apparatus including:
a main body unit;
a display unit;
a turning unit configured to turnably hold the display unit with respect to the main body unit;
a first acceleration sensor configured to detect a first gravity acceleration applied to the main body unit;
a second acceleration sensor configured to detect a second gravity acceleration applied to the display unit;
an angle calculation unit configured to calculate posture angles of the display unit and the main body unit from the gravity accelerations acquired from both of the first acceleration sensor and the second acceleration sensor; and
a display switching unit configured to switch a display state of the display unit by determining the display state of the display unit based on the posture angles calculated by the angle calculation unit,
in which it is determined whether to switch the display state of the display unit, based on the display state determined by the display switching unit.

Configuration 2

The imaging apparatus according to configuration 1,
in which the display switching unit includes a display storage unit configured to store the display state determined by the display switching unit over time, and a response speed setting unit configured to set a response speed of display switching, and
in which, in a case where a same display state is continued within a time set by the response speed setting unit, the continued display state is displayed.

Configuration 3

The imaging apparatus according to configuration 1 or 2,
in which the display switching unit includes a moving image recording determination unit configured to determine whether a moving image is being recorded,
in which the display switching unit includes a function of switching a display state between a first display state and a second display state, and
in which, in a case where the moving image recording determination unit determines that a moving image is being recorded, a boundary angle for switching a display state between the first display state and the second display state is expanded.

Configuration 4

The imaging apparatus according to any one of configurations 1 to 3, further including a vibration detection unit configured to detect vibration applied to the main body unit or the display unit,
in which, in a case where the vibration detected by the vibration detection unit is greater than a predetermined threshold, the display switching unit expands a boundary angle for switching a display state between the first display state and the second display state.

Configuration 5

The imaging apparatus according to any one of configurations 1 to 4, in which a method of calculating the posture angles by the angle calculation unit is changed based on a state of the vibration detected by the vibration detection unit.

Configuration 6

The imaging apparatus according to any one of configurations 1 to 5,
in which the angle calculation unit includes a lowpass filter, and
in which a cutoff frequency of the lowpass filter in a case where the vibration applied to the imaging apparatus detected by the vibration detection unit is large is set lower than the cutoff frequency of the lowpass filter in a case where the vibration is small.

Configuration 7

The imaging apparatus according to any one of configurations 1 to 6, further including:
a first acceleration sensor configured to detect a first gravity acceleration applied to the main body unit; and
a second acceleration sensor configured to detect a second gravity acceleration applied to the display unit,
in which the first acceleration sensor and the second acceleration sensor each detect the gravity acceleration by a same acceleration sensor.

Configuration 8

The imaging apparatus according to any one of configurations 1 to 7,
in which the angle calculation unit includes a temperature information acquisition unit configured to acquire temperature information inside the imaging apparatus, and an elapsed time acquisition unit configured to acquire an elapsed time from startup of the imaging apparatus,
in which the temperature information acquisition unit is arranged at a position closer to the first acceleration sensor than to the second acceleration sensor,
in which, by using the temperature information inside the imaging apparatus acquired by the temperature information acquisition unit, the first acceleration sensor sets the cutoff frequency of the lowpass filter when the temperature information is high, to be lower than the cutoff frequency of the lowpass filter when the temperature information is low, or by using the time acquired by the elapsed time acquisition unit, the first acceleration sensor sets the cutoff frequency of the lowpass filter when the time acquired by the elapsed time acquisition unit is long, to be lower than the cutoff frequency of the lowpass filter when the time is short, and
in which the second acceleration sensor sets the cutoff frequency of the lowpass filter when the time acquired by the elapsed time acquisition unit is long, to be lower than the cutoff frequency of the lowpass filter when the time is short.

Configuration 9

A method of controlling an imaging apparatus, the imaging apparatus including a main body unit, a display unit, a turning unit configured to turnably hold the display unit with respect to the main body unit, a first acceleration sensor configured to detect a first gravity acceleration applied to the main body unit, a second acceleration sensor configured to detect a second gravity acceleration applied to the display unit, an angle calculation unit configured to calculate posture angles of the display unit and the main body unit from the gravity accelerations acquired from both of the first acceleration sensor and the second acceleration sensor, and a display switching unit configured to switch a display state of the display unit by determining the display state of the display unit based on the posture angles calculated by the angle calculation unit, the method including determining whether to switch the display state of the display unit, based on the display state determined by the display switching unit.

According to the exemplary embodiments, it is possible to provide the imaging apparatus that can switch a display state between the normal display and the reverse display of the display unit expected by the user, in a case where the vibration applied to the imaging apparatus is large, in a case where a moving image is being captured, or the like.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An imaging apparatus comprising:
   a main body unit;
   a display unit configured to turn with respect to the main body unit;
   a first acceleration sensor configured to detect a first gravity acceleration applied to the main body unit;
   a second acceleration sensor configured to detect a second gravity acceleration applied to the display unit;
   an angle calculation unit configured to calculate posture angles of the display unit and the main body unit from the gravity accelerations acquired from both of the first acceleration sensor and the second acceleration sensor; and
   a display switching unit configured to switch a display state of the display unit between a first display state corresponding to a first posture angle and a second display state corresponding to a second posture angle based on the posture angles calculated by the angle calculation unit,
   wherein a determination is made whether to switch the display state of the display unit, based on the display state determined by the display switching unit,
   wherein the display switching unit includes a display storage unit configured to store the display state determined by the display switching unit over time, and a response speed setting unit configured to set a response speed of display switching, and
   wherein, in a case where a time for which the first display state is continued is within a time corresponding to a predetermined threshold, the first display state is continued even if the posture angle changed to the second posture angle.

2. The imaging apparatus according to claim 1,
   wherein the display switching unit includes a moving image recording determination unit configured to determine whether a moving image is being recorded,
   wherein the display switching unit includes a function of switching a display state between a first display state and a second display state, and
   wherein, in a case where the moving image recording determination unit determines that a moving image is being recorded, a boundary angle for switching the display state between the first display state and the second display state is expanded.

3. The imaging apparatus according to claim 2, further comprising a vibration detection unit configured to detect vibration applied to the main body unit or the display unit,
   wherein, in a case where the vibration detected by the vibration detection unit is greater than a predetermined threshold, the display switching unit expands the boundary angle for switching the display state between the first display state and the second display state.

4. The imaging apparatus according to claim 3, wherein a method of calculating the posture angles by the angle calculation unit is changed based on a state of the vibration detected by the vibration detection unit.

5. The imaging apparatus according to claim 4,
   wherein the angle calculation unit includes a lowpass filter, and
   wherein a cutoff frequency of the lowpass filter in a case where the vibration applied to the imaging apparatus detected by the vibration detection unit is large is set lower than the cutoff frequency of the lowpass filter in a case where the vibration is small.

6. The imaging apparatus according to claim 5,
   wherein the angle calculation unit includes a temperature information acquisition unit configured to acquire temperature information inside the imaging apparatus, and an elapsed time acquisition unit configured to acquire an elapsed time from startup of the imaging apparatus,
   wherein the temperature information acquisition unit is arranged at a position closer to the first acceleration sensor than to the second acceleration sensor,
   wherein, by using the temperature information inside the imaging apparatus acquired by the temperature information acquisition unit, the first acceleration sensor sets the cutoff frequency of the lowpass filter when the temperature information is high, to be lower than the cutoff frequency of the lowpass filter when the temperature information is low, or by using the time acquired by the elapsed time acquisition unit, the first acceleration sensor sets the cutoff frequency of the lowpass filter when the time acquired by the elapsed time acquisition unit is long, to be lower than the cutoff frequency of the lowpass filter when the time is short, and
   wherein the second acceleration sensor sets the cutoff frequency of the lowpass filter when the time acquired by the elapsed time acquisition unit is long, to be lower than the cutoff frequency of the lowpass filter when the time is short.

7. The imaging apparatus according to claim 1,
   wherein the first acceleration sensor and the second acceleration sensor each detect the gravity acceleration by a same acceleration sensor.

8. A method of controlling an imaging apparatus, the imaging apparatus including a main body unit, a display unit configured to turn with respect to the main body unit, a first acceleration sensor configured to detect a first gravity acceleration applied to the main body unit, a second acceleration sensor configured to detect a second gravity acceleration applied to the display unit, an angle calculation unit configured to calculate posture angles of the display unit and the main body unit from the gravity accelerations acquired from both of the first acceleration sensor and the second acceleration sensor, and a display switching unit configured to switch a display state of the display unit between a first display state corresponding to a first posture angle and a second display state corresponding to a second posture angle based on the posture angles calculated by the angle calculation unit, the method comprising:
   continuing the first display state even if the posture angle changed to the second posture angle in a case where a time for which the first display state is continued is within a time corresponding to a predetermined threshold.

* * * * *